United States Patent
Burgmair et al.

(10) Patent No.: US 10,648,416 B2
(45) Date of Patent: May 12, 2020

(54) INTERNAL COMBUSTION ENGINE

(71) Applicant: INNIO Jenbacher GmbH & Co OG, Jenbach, Tirol (AT)

(72) Inventors: Raphael Burgmair, Feldkirchen-Westerham (DE); Medy Satria, Munich (DE); Dino Imhof, Munich (DE); Stephan Laiminger, Jenbach (AT)

(73) Assignee: INNIO JENBACHER & GMBH CO OG, Jenbach (AT)

( * ) Notice: Subject to any disclaimer, the term of this patent is extended or adjusted under 35 U.S.C. 154(b) by 17 days.

(21) Appl. No.: 15/773,637

(22) PCT Filed: Nov. 3, 2016

(86) PCT No.: PCT/AT2016/060098
§ 371 (c)(1),
(2) Date: Aug. 8, 2018

(87) PCT Pub. No.: WO2017/075641
PCT Pub. Date: May 11, 2017

(65) Prior Publication Data
US 2018/0355812 A1    Dec. 13, 2018

(30) Foreign Application Priority Data
Nov. 4, 2015    (EP) ..................................... 15192915

(51) Int. Cl.
*F02D 41/14*    (2006.01)
*F02D 41/38*    (2006.01)
(Continued)

(52) U.S. Cl.
CPC ..... *F02D 41/1402* (2013.01); *F02D 41/1401* (2013.01); *F02D 41/3836* (2013.01);
(Continued)

(58) Field of Classification Search
CPC .......... F02D 41/24; F02D 41/38; F02D 41/40; F02D 41/22; F02D 41/2496;
(Continued)

(56) References Cited

U.S. PATENT DOCUMENTS 6,497,223 B1    12/2002    Tuken et al.
6,557,530 B1 *   5/2003    Benson .................... F02D 41/22
                                                      123/447

(Continued)

FOREIGN PATENT DOCUMENTS

DE        10055192 A1    5/2002
DE    102006034514 A1    1/2008
(Continued)

OTHER PUBLICATIONS

Extended European Search Report and Opinion issued in connection with corresponding EP Application No. 15192915.5 dated Jun. 27, 2016 (English Translation Not Available).

*Primary Examiner* — George C Jin
(74) *Attorney, Agent, or Firm* — Fletcher Yoder, P.C.

(57) ABSTRACT

An internal combustion engine is provided. The internal combustion engine includes a control device, and at least one injector for liquid fuel that includes a discharge opening for the liquid fuel. The at least one injector is connected to a collection volume by means of a line for liquid fuel. Liquid fuel can flow through the line for liquid fuel from the at least one injector to the collection volume. A control element that can be adjusted by the control device via a control signal is also provided. Via the control element, a back pressure in the line for liquid fuel can be adjusted in order to adjust an amount of liquid fuel discharged through the discharge opening of the at least one injector. Also provided is a method for operating an internal combustion engine and an injector.

15 Claims, 2 Drawing Sheets

(51) Int. Cl.
*F02D 41/40* (2006.01)
*F02D 41/28* (2006.01)

(52) U.S. Cl.
CPC ........ *F02D 41/40* (2013.01); *F02D 2041/143* (2013.01); *F02D 2041/1416* (2013.01); *F02D 2041/1418* (2013.01); *F02D 2041/1434* (2013.01); *F02D 2041/286* (2013.01); *F02D 2200/0602* (2013.01); *F02D 2200/063* (2013.01); *F02D 2200/0611* (2013.01); *F02D 2200/0616* (2013.01); *F02D 2250/31* (2013.01); *Y02T 10/44* (2013.01)

(58) Field of Classification Search
CPC .. F02D 41/3809; F02D 41/14; F02D 41/1402; F02D 41/3836; F02D 2041/224; F02D 2041/227; F02D 2041/1418; F02D 2041/1416; F02D 2200/0612; F02D 2200/0602
See application file for complete search history.

(56) References Cited

U.S. PATENT DOCUMENTS

| | | | |
|---|---|---|---|
| 6,820,593 B2 | 11/2004 | Remele et al. | |
| 6,904,354 B2 | 6/2005 | Kuegel et al. | |
| 6,907,861 B2 | 6/2005 | Asano et al. | |
| 7,451,037 B2 | 11/2008 | Ikeda | |
| 7,628,146 B2 | 12/2009 | Kloppenburg et al. | |
| 7,891,337 B2 | 2/2011 | Takeuchi et al. | |
| 8,214,131 B2 | 7/2012 | Kloos et al. | |
| 8,290,687 B2 | 10/2012 | Olbrich et al. | |
| 8,756,986 B2 | 6/2014 | Jessen et al. | |
| 8,886,441 B2 | 11/2014 | Dolker | |
| 9,664,134 B2 | 5/2017 | Remele et al. | |
| 2005/0103312 A1* | 5/2005 | Uchiyama | F02D 41/221 123/457 |
| 2012/0323468 A1* | 12/2012 | Miyaura | F02D 41/40 701/105 |
| 2013/0226474 A1* | 8/2013 | Adler | G01L 27/00 702/50 |
| 2015/0260121 A1* | 9/2015 | Courtiel | F02D 41/064 123/295 |
| 2016/0138509 A1 | 5/2016 | Walder et al. | |

FOREIGN PATENT DOCUMENTS

| | | | |
|---|---|---|---|
| DE | 10 2012 109 655 A1 | 4/2014 | |
| EP | 2003317 A2 | 12/2008 | |
| WO | 99/45259 A2 | 9/1999 | |
| WO | 01/83969 A2 | 11/2001 | |
| WO | 2014056595 A1 | 4/2014 | |
| WO | 2014060075 A1 | 4/2014 | |
| WO | 2014198388 A1 | 12/2014 | |
| WO | WO-2014202202 A1 * | 12/2014 | ........... F02D 41/248 |

* cited by examiner

INTERNAL COMBUSTION ENGINE

FIELD OF TECHNOLOGY

This disclosure relates to an internal combustion engine with the features of the preamble of claim 1 and a method with the features of the preamble of claim 13 or 14.

BACKGROUND

A class-specific internal combustion engine and a class-specific method are derived from DE 100 55 192 A1. This publication discloses a method for concentricity control of diesel engines, wherein the injection quantity of the injectors assigned to the cylinders is corrected by means of a correction factor.

The injectors are connected to a collection volume for liquid fuel (which can be designed as tank or manifold) by means of lines. Fuel can flow from the injectors to the collection volume through these lines. A leakage of the injectors can be drained through these lines.

The problem is that the internal combustion engine known from the prior art is not operated at the allowable limit for the pollutant emissions to mitigate signs of aging and wear and tear of the injector but taking into account a deterioration factor allows a greater distance to the allowable limit.

SUMMARY

The object of the disclosure is to provide an internal combustion engine and a method in which an operation of the internal combustion engine closer to the limit for the pollutant emissions is possible throughout the service life of the injector.

This object is achieved by an internal combustion engine with the features of claim 1 and a method with the features of claim 13 or 14. Advantageous embodiments of the disclosure are defined in the dependent claims.

An example of the liquid fuel is diesel. It could also be heavy oil or another self-igniting fuel.

According to the disclosure, a control element that can be adjusted by the control device by means of a control signal is provided, by means of which the back pressure in the line can be adjusted in order to adjust the amount of liquid fuel that is discharged via the discharge opening of the injector. This represents an option of influencing the amount of liquid fuel that is discharged, which can be provided alone or in combination with other influencing options (such as a duration of operating an actuator of the injector). In practice, a plurality of combustion chambers are provided, each of which is provided with an injector for liquid fuel. The invention has the advantage that a correction of the amount of liquid fuel that is discharged can be made without changing a duration of the actuation of an actuator (e.g. a duration of current flow of a solenoid valve) of a single injector.

The invention can be used in an embodiment to compensate for an injector drift over the service life of the injector (which is caused by aging, wear and the like) without having to make an individual modification of a duration of the actuation of an actuator of the injector.

It is more particularly provided that
the control device controls or regulates the injector using an actuator control signal and
that a sensor is provided through which a measurement variable of the at least one injector can be measured,
wherein the sensor has or can be brought into a signal connection to the control device, and
that an algorithm is stored in the control device, which receives as input variable at least the control signal for the control element and/or the actuator control signal and the measurement values of the sensor and using an injector model calculates the amount of liquid fuel that is discharged via the discharge opening of the injector and compares the amount of liquid fuel calculated by means of the injector model with a target value of the amount of liquid fuel and performs the adjustment of the back pressure and/or of the actuator control signal in accordance with the result of the comparison.

Instead of the amount of injected fuel, it is of course also possible to calculate the volume or other variables which are characteristic of a certain amount of injected fuel. All these possibilities are covered in this disclosure when using the term "amount".

It is in an embodiment provided that the algorithm comprises a pilot control, which from the desired target value of the amount of liquid fuel calculates a pilot control signal for the control element to adjust the back pressure and/or a pilot control signal for the actuator control signal for the injection duration.

The pilot control for the actuator control signal ensures a fast system response, since it controls the injector with an injection duration as if no injector variability would exist. The pilot control uses, for example, an injector map (which, for example, in the case of an actuator designed as a solenoid valve, indicates the duration of current flow over the injection amount or volume) or an inverted injector model to convert the target value of the amount of liquid fuel to be injected into the pilot control command for the injection duration. Via the pilot control of the control element for the adjustment of the back pressure, an actuator dependent adjustment can be made, such as may be necessary for the correction of an injector drift.

When the control device is designed with pilot control, it can be particularly provided that the algorithm comprises a feedback loop (FB),
which, taking into account the pilot control signal calculated by the pilot control for the control element for the adjustment of the back pressure and/or
the pilot control signal calculated by the pilot control for the actuator control signal for the injection duration
and the at least one measurement variable
which, using the injector model calculates the amount of liquid fuel discharged via the discharge opening of the injector and, if necessary, corrects the pilot control command calculated by the pilot control for the control element and/or the actuator.

The feedback loop is used to correct the inaccuracies of the pilot control (due to manufacturing variabilities, wear, etc.), which cause an injector drift.

The algorithm has in an embodiment an observer which, using the injector model and taking into account the
control signal of the control element and/or
the actuator control signal
and the at least one measurement variable
estimates the injected amount of liquid fuel.

An actual measurement of the injected amount of liquid fuel is therefore not required for the feedback loop. Regardless of whether a feedback loop is provided, the injected amount of liquid fuel in the pilot control estimated by the observer can be used to improve the actuator control signal or the control signal for the control element.

Various possible formations of the observer are known to the person skilled in the art from the literature (e.g. Luenberger observer, Kalman filter, "sliding mode" observer, etc.).

The observer can also serve to take into account the changing state of the injector over the service life of the injector (e.g. due to aging or wear and tear) with the help of the injector model for an improvement of the pilot control signal and/or the actuator control signal.

Essentially it is possible to calculate the actuator control signal and/or the pilot control signal for the control element on the basis of the target value for the injected amount of liquid fuel and on the basis of the amount of liquid fuel estimated by the observer. This gives an adaptive pilot control signal modified by the observer. In this case, the control is therefore not constructed in two parts, with a pilot control and a feedback loop correcting the pilot control signal.

It may be provided that the injector model comprises at least:
the pressure progressions in the volumes of the injector filled with the liquid fuel
mass flow rates between the volumes of the injector filled with the liquid fuel
a position of the needle, in an embodiment relative to the needle seat
dynamics of the actuator of the needle, in an embodiment solenoid valve dynamics The injector may comprise at least:
an input storage chamber connected to a common rail of the internal combustion engine
a storage chamber for liquid fuel connected to said input storage chamber
a volume connected to the storage chamber via needle seat
a connection volume connected on one side to the storage chamber and on the other side with the line connected connection volumes
a discharge opening for liquid fuel, which can be closed by a needle and is connected to the volume via a needle seat
an actuator controllable by means of the actuator control signal, in an embodiment a solenoid valve, for opening the needle
in an embodiment a control chamber connected on one side to the storage chamber and on the other side to the connection volume.

The needle is usually preloaded by a spring against the opening direction.

An injector can be provided, which does not require a control chamber, e.g. an injector in which the needle is controlled by a piezo element.

The at least one measurement variable can be selected from the following variables or a combination thereof:
pressure in a common rail of the internal combustion engine
pressure in an input storage chamber of the injector
pressure in a control chamber of the injector
start of needle lift-off from the needle seat.

The control device may be designed to execute the algorithm during each combustion cycle or selected combustion cycles of the internal combustion engine and in case of deviations to correct the actuator control signal or the pilot control signal for the control element during this combustion cycle.

Alternatively, the control device may be designed to execute the algorithm during each combustion cycle or selected combustion cycles of the internal combustion engine and in case of deviations to correct the actuator control signal and/or the pilot control signal in one of the subsequent combustion cycles, in an embodiment in the immediate subsequent combustion cycle.

Alternatively, or in addition to one of the above-mentioned embodiments, the control device may be designed to execute the algorithm during each combustion cycle or selected combustion cycles of the internal combustion engine and to statically evaluate the deviations that have occurred and to make a correction for this or one of the subsequent combustion cycles in accordance with the static evaluation.

It is not absolutely necessary for the invention to measure the amount of injected liquid fuel directly. It is also not necessary to deduce directly from the at least one measurement variable the actual injected amount of liquid fuel.

The invention can in an embodiment be used in a stationary internal combustion engine, for marine applications or mobile applications such as so-called "non-road mobile machinery" (NRMM), in an embodiment as a reciprocating piston engine. The internal combustion engine can be used as a mechanical drive, e.g. for operating compressor systems or coupled with a generator to a genset for generating electrical energy.

The internal combustion engine in an embodiment comprises a plurality of combustion chambers with corresponding gas supply devices and injectors. Each combustion chamber can be controlled individually.

BRIEF DESCRIPTION OF THE DRAWINGS

Exemplary embodiments of the disclosure are explained in more detail by the figures below. They are as follows.

DETAILED DESCRIPTION

Figure 1:
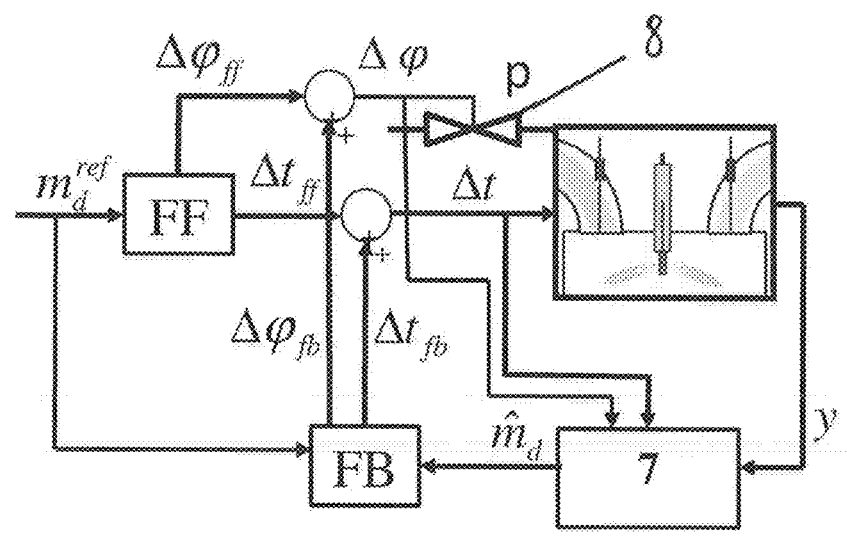
FIG. 1 an exemplary embodiment of a control diagram according to the disclosure.

FIG. 1: The object of the injector control in this exemplary embodiment is the control of the actual injected amount of liquid fuel to a target value $m_d^{ref}$, by controlling the injection duration $\Delta t$ and/or the back pressure p (which is present in the line which connects the injector to a collection volume for liquid fuel). The control strategy is carried out by a pilot control (FF), which calculates from a desired target value of the amount $m_d^{ref}$ of the amount of liquid fuel a pilot control signal $\Delta t_{ff}$ (hereinafter also referred to as "control command") for the injection duration $\Delta t$ and/or a pilot control signal for the control element and a feedback loop (FB) which, using an observer 7 ("estimator") taking into account the control signal $\Delta t$ calculated by the pilot control for the injection duration and/or the control signal $\Delta \varphi$ for the control element calculated by the pilot control and at least one measurement variable y (e.g. one of the pressure progressions $p_{IA}$, $p_{cc}$, $p_{JC}$, $p_{AC}$, $p_{SA}$ occurring in the injector or the start of the needle lift-off from the needle seat), the mass flow $\dot{m}_d$ of liquid fuel via the discharge opening of the injector estimated by means of the injector model and, if necessary, corrects the target value $\Delta t_{ff}$ calculated by the pilot control for the injection duration or the back pressure $\Delta \varphi_{ff}$ by means of correction factors $\Delta t_{fb}$ or $\Delta \varphi_{fb}$ (both of which can be negative).

The pilot control ensures a fast system response by means of the actuator control signal, since it controls the injector with an injection duration $\Delta t$ as if no injector variability would exist.

The pilot control uses a calibrated injector map (which indicates the duration of current flow over the injection amount or volume) or an inverted injector model to convert the target value of the amount $m_d^{ref}$ of liquid fuel into the pilot control command $\Delta t_{ff}$ for the injection duration.

The feedback loop (FB) is used to correct the inaccuracies of the pilot control (due to manufacturing variabilities, wear, etc.), which cause an injector drift. The feedback loop compares the target value for the injection duration $\Delta t$ and/or the back pressure p with the estimated injected amount of liquid fuel $\hat{m}_d$ and gives as feedback a correction control command for the injection duration $\Delta t_{fb}$ and/or the back pressure $\Delta \varphi_{fb}$, if there is a discrepancy between $m_d^{ref}$ and $\hat{m}_d$. The addition of $\Delta t_{ff}$ and $\Delta t_{fb}$ or $\Delta \varphi_{ff}$ and $\Delta \varphi_{fb}$ gives the final injection duration $\Delta t$ or the final back pressure p.

The observer estimates the injected amount $\hat{m}_d$ of liquid fuel in dependence of the at least one measurement variable y and the final injection duration $\Delta t$ and/or the final back pressure p. The at least one measurement variable y can refer to: common rail pressure $p_{CR}$, pressure in the input storage chamber $p_{IA}$, pressure in the control chamber $p_{CC}$ and start of the needle lift-off from the needle seat. The observer uses a reduced injector model to estimate the injected amount of liquid fuel.

Figure 2:
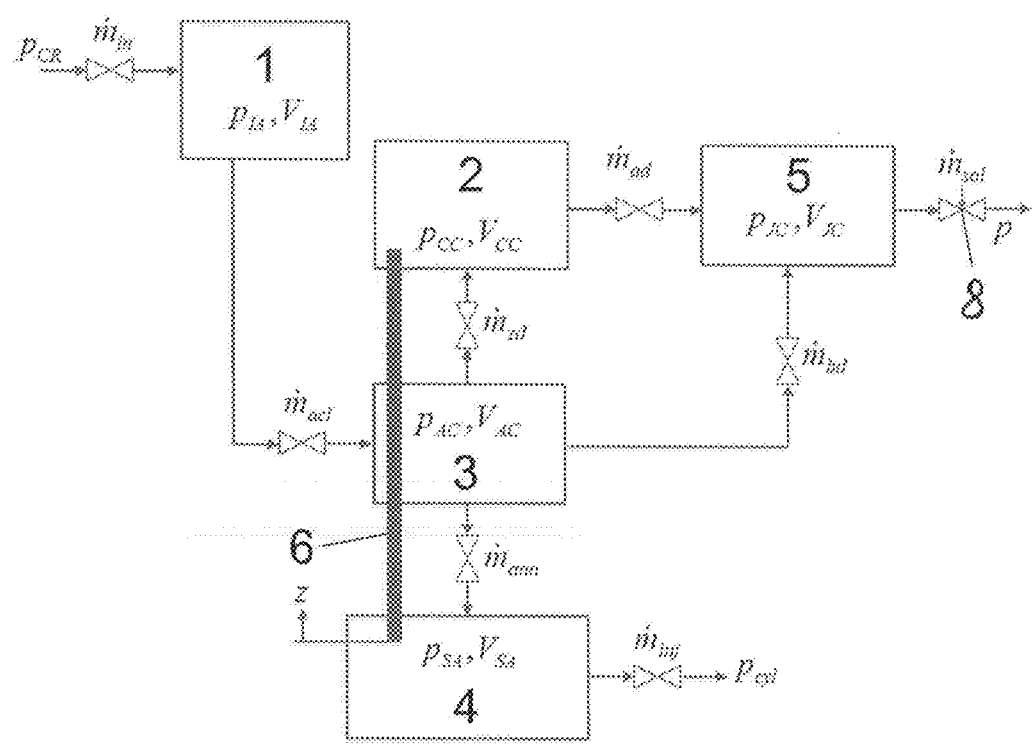
FIG. 2 an example of a schematic representation of an injector.

FIG. 2 shows a block diagram of a reduced injector model. The injector model consists of a structural model of the injector and an equation system to describe the dynamic behavior of the structural model. The structural model consists of five modeled volumes: input storage chamber 1, storage chamber 3, control chamber 2, volume over needle seat and connection volume 5.

The input storage chamber 1 represents the summary of all volumes between the input choke and the non-return valve. The storage chamber 3 represents the summary of all volumes from the non-return valve to volume 4 above the needle seat.

The volume 4 over the needle seat represents the summary of all volumes between the needle seat to the discharge opening of the injector. The connection volume 5 represents the summary of all volumes which connects the storage chamber 3 and the control chamber 2 with the solenoid valve.

The dynamic behavior of the structure model is described by the following equation systems:

Pressure Dynamics

The temporal evolution of the pressure within each of the volumes is calculated based on a combination of the mass conservation law and the pressure density characteristic of the liquid fuel. The temporal evolution of the pressure follows from:

$$\left[ \dot{p}_{IA} = \frac{K_f}{\rho_{IA} V_{IA}} (\dot{m}_{in} - \dot{m}_{aci}) \right]$$

$$\left[ \dot{p}_{CC} = \frac{K_f}{\rho_{CC} V_{CC}} (\dot{m}_{zd} - \dot{m}_{ad} - \rho_{CC} \dot{V}_{CC}) \right]$$

$$\left[ \dot{p}_{JC} = \frac{K_f}{\rho_{JC} V_{JC}} (\dot{m}_{bd} + \dot{m}_{ad} - \dot{m}_{sol}) \right]$$

$$\left[ \dot{p}_{AC} = \frac{K_f}{\rho_{AC} V_{AC}} (\dot{m}_{aci} - \dot{m}_{ann} - \dot{m}_{bd} - \dot{m}_{zd} - \rho_{AC} \dot{V}_{AC}) \right]$$

$$\left[ \dot{p}_{SA} = \frac{K_f}{\rho_{SA} V_{SA}} (\dot{m}_{ann} - \dot{m}_{inj} - \rho_{SA} \dot{V}_{SA}) \right]$$

Formula Symbols Used
$p_{IA}$: Pressure in the input storage chamber 1 in bar
$p_{CC}$: Pressure in the control chamber 2 in bar
$p_{JC}$: Pressure in the connection volume 5 in bar
$p_{AC}$: Pressure in the storage chamber 3 in bar
$p_{SA}$: Pressure in the small storage chamber 4 in bar
$\rho_{IA}$: Diesel mass density within the input storage chamber 1 in kg/m$^3$
$\rho_{CC}$: Diesel mass density within the control chamber 2 in kg/m$^3$
$\rho_{JC}$: Diesel mass density within the connection volume 5 in kg/m$^3$
$\rho_{AC}$: Diesel mass density within the storage chamber 3 in kg/m$^3$
$\rho_{SA}$: Diesel mass density within the small storage chamber 4 in kg/m$^3$
$K_f$: Bulk modulus of diesel fuel in bar Needle Dynamics The needle position is calculated by the following equation of motion:

$$\ddot{z} = \begin{cases} 0 & \text{if } F_{hyd} \leq F_{pre} \\ \frac{1}{m}(F_{hyd} - Kz - B\dot{z} - F_{pre}) & \text{if } F_{hyd} > F_{pre} \end{cases} \quad \text{Eq. 2.1}$$

$$F_{hyd} = p_{AC} A_{AC} + p_{SA} A_{SA} - p_{CC} A_{CC} \quad \text{Eq. 2.2}$$

$$0 \leq z \leq z_{max} \quad \text{Eq. 2.3}$$

Formula Symbols Used:
Z: Needle position in meters (m)
$Z_{max}$: Maximum deflection of the needle 6 in m
K: Spring stiffness in N/m
B: Spring damping coefficient in N·s/m
$F_{pre}$: Spring preload in N
$A_A$: Hydraulic effective area in the storage chamber 3 in m$^2$
$A_{SA}$: Hydraulic effective area in the small storage chamber 4 in m$^2$
$A_{CC}$: Hydraulic effective area in the control chamber 2 in m$^2$ Dynamics of the Solenoid Valve The solenoid valve is modeled by a first order transfer function, which converts the valve opening command in a valve position. This is given by:

$$u_{sol}^{cmd} \rightarrow \boxed{\frac{z_{sol}^{max}}{\tau_{sol} s + 1}} \rightarrow z_{sol}$$

The transient system behavior is characterized by the time constant $\tau_{sol}$ and the position of the needle 6 at the maximum valve opening is given by $Z_{sol}^{max}$. Instead of a solenoid valve, a piezoelectric actuation is possible.

Mass Flow Rates

The mass flow rate through each valve is calculated from the standard throttle equation for liquids, which is:

$$\dot{m}_{in} = A_{in} C_{din} \sqrt{2\rho_j |p_{CR} - p_{IA}|} \cdot sgn(p_{CR} - p_{IA})$$

$$|\dot{m}_{bd} = A_{bd} C_{dbd} \sqrt{2\rho_j |p_{AC} - p_{JC}|} \cdot sgn(p_{AC} - p_{JC})$$

$$|\dot{m}_{zd} = A_{zd} C_{dzd} \sqrt{2\rho_j |p_{AC} - p_{CC}|} \cdot sgn(p_{AC} - p_{CC})$$

$$|\dot{m}_{ad} = A_{od} C_{dod} \sqrt{2\rho_j |p_{CC} - p_{JC}|} \cdot sgn(p_{CC} - p_{JC})$$

-continued $$\dot{m}_{sol} = A_{sol}C_{dsol}\sqrt{2\rho_j |p_{JC} - p_{LP}|} \cdot sgn(p_{JC} - p_{LP})$$

$$\dot{m}_{aci} = A_{aci}C_{daci}\sqrt{2\rho_j |p_{IA} - p_{AC}|} \cdot sgn(p_{IA} - p_{AC})$$

$$\dot{m}_{ann} = A_{ann}C_{dann}\sqrt{2\rho_j |p_{AC} - p_{SA}|} \cdot sgn(p_{AC} - p_{SA})$$

$$\dot{m}_{inj} = A_{inj}C_{dinj}\sqrt{2\rho_{SA} |p_{SA} - p_{cyl}|} \cdot sgn(p_{SA} - p_{cyl})$$

$$\rho_j = \begin{cases} \rho_{in} & \text{if } p_{in} \geq p_{out} \\ \rho_{out} & \text{if } p_{in} > p_{out} \end{cases}$$

Formula Symbols Used:
$\dot{m}_{in}$: mass flow rate through each input choke in kg/s
$\dot{m}_{bd}$: mass flow rate through the bypass valve between storage chamber 3 and the connection volume 5 in kg/s
$\dot{m}_{zd}$: mass flow rate through the feed valve at the inlet of the control chamber 2 in kg/s
$\dot{m}_{ad}$: mass flow rate through the outlet valve of the control chamber 2 in kg/s
$\dot{m}_{sol}$: mass flow rate through the solenoid valve in kg/s
$\dot{m}_{aci}$: mass flow rate through the inlet of the storage chamber 3 in kg/s
$\dot{m}_{ann}$: mass flow rate through the needle seat in kg/s
$\dot{m}_{inj}$: mass flow rate through the injector nozzle in kg/s Based on the above formulated injector model, the person skilled in the art obtains by means of the observer in a known manner (see, for example, Isermann, Rolf, "Digital Control Systems", Springer Verlag Heidelberg 1977 chapter 22.3.2, page 379 et seq., or F. Castillo et al, "Simultaneous Air Fraction and Low-Pressure EGR Mass Flow Rate Estimation for Diesel Engines", IFAC Joint conference SSSC—5th Symposium on System Structure and Control, Grenoble, France 2013) the estimated value $\hat{m}_d$.

Using the above equation systems, the so-called "observer equations" are constructed, in an embodiment using a known observer of the "sliding mode observer" type, by adding the so-called "observer law" to the equations of the injector model. With a "sliding mode" observer, the observer law is obtained by calculating a "hypersurface" from the at least one measuring signal and the value given by the following observer equations. By squaring the equation of the hypersurface, a generalized Ljapunov equation (generalized energy equation) is obtained. It is a functional equation. The observer law is that function which minimizes the functional equation. This can be determined by the known variation techniques or numerically. This process is carried out within one combustion cycle for each time step (depending on the time resolution of the control).

The result is depending on the application, the estimated injected amount of liquid fuel, the position of the needle 6 or one of the pressures in one of the volumes of the injector.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:
1. An internal combustion engine comprising:
a control device; and
at least on injector for liquid fuel comprising a discharge opening for the liquid fuel;
wherein the at least one injector is connected to a collection volume via a line for liquid fuel through which the liquid fuel can flow from the at least one injector to the collection volume; and
wherein a control element, adjustable by the control device via a control signal, adjusts a back pressure in the line for liquid fuel to adjust an amount of liquid fuel discharged via the discharge opening of the at least one injector, at least in part by draining or leaking a separate amount of liquid fuel from the at least one injector, through the line for liquid fuel, and to the collection volume.

2. The internal combustion engine according to claim 1, wherein the control device controls or regulates the at least one injector using an actuator control signal, wherein a sensor is operable to measure a measurement variable of the at least one injector, wherein the sensor has a signal connection to the control device, and an algorithm is stored in the control device, which:
receives as input variables at least the control signal for the control element, the actuator control signal, and/or measurement values corresponding to the measurement variable measured by the sensor; and
using an injector model, calculates the amount of liquid fuel discharged via the discharge opening of the at least one injector, compares the amount of liquid fuel calculated via the injector model with a desired target value of the amount of liquid fuel, and causes the control device to adjust the back pressure in accordance with the result of the comparison.

3. The internal combustion engine according to claim 2, wherein the algorithm comprises a pilot control, which from the desired target value of the amount of liquid fuel calculates a pilot control signal for the control element to adjust the back pressure and/or the pilot control signal for the actuator control signal for the injection duration.

4. The internal combustion engine according to claim 3, wherein the algorithm comprises a feedback loop with:
the pilot control signal calculated by the pilot control for the control element to adjust the back pressure and/or the actuator control signal calculated for an injection duration; and
the measurement variable; and
wherein the algorithm uses the feedback loop and the injector model to calculate the amount of liquid fuel discharged via the discharge opening of the at least one injector and, if necessary, corrects the pilot control signal calculated by the pilot control for the control element.

5. The internal combustion engine according to claim 2, wherein the algorithm comprises an observer which, via the injector model, uses the control signal for the control element and/or the actuator control signal, and the measurement variable, to estimate the amount of liquid fuel discharged via the discharge opening of the at least one injector.

6. The internal combustion engine according to claim 1, wherein the control element is designed as a control valve.

7. The internal combustion engine according to claim 1, wherein the at least one injector comprises at least:
an input storage chamber connected to a common rail of the internal combustion engine;
a storage chamber for liquid fuel connected to the input storage chamber;
a volume over a needle seat connected to the storage chamber;

a connection volume connected on one side to the storage chamber and on the other side with the line for liquid fuel;

the discharge opening for liquid fuel, which can be closed by a needle and is connected to the volume over the needle seat; and an actuator for the at least one injector controllable by means of the actuator control signal for opening the needle; and a control chamber connected on one side to the storage chamber and on the other side to the connection volume.

8. The internal combustion engine according to claim 2, wherein the measurement variable is selected from the following variables or a combination thereof:

pressure in a common rail of the internal combustion engine;

pressure in an input storage chamber of the at least one injector;

pressure in a control chamber of the at least one injector; and start of a needle lift-off from a needle seat.

9. The internal combustion engine according to claim 2, wherein the control device is designed to execute the algorithm during each combustion cycle or selected combustion cycles of the internal combustion engine, and in case of deviations, to correct the control signal for the control element in a subsequent combustion cycles.

10. The internal combustion engine according to claim 2, wherein the control device is designed to execute the algorithm during each combustion cycle or selected combustion cycles of the internal combustion engine and to statically evaluate deviations that have occurred and to make a correction of the control signal for the control element for a current or subsequent combustion cycle in accordance with the static evaluation.

11. The internal combustion engine according to claim 2, wherein the algorithm, using the injector model, causes the control device to adjust the actuator control signal in accordance with the result of the comparison.

12. An internal combustion engine comprising:

a control device; and at least on injector for liquid fuel comprising a discharge opening for the liquid fuel;

wherein the at least one injector is connected to a collection volume via a line for liquid fuel through which the liquid fuel can flow from the at least one injector to the collection volume;

wherein a control element adjustable by the control device via a control signal, adjusts a back pressure in the line for liquid fuel to adjust an amount of liquid fuel discharged via the discharge opening of the at least one injector;

wherein the control device controls or regulates the at least one injector using an actuator control signal, wherein a sensor is operable to measure a measurement variable of the at least one injector, wherein the sensor has a signal connection to the control device, and an algorithm is stored in the control device, which:

receives as input variables at least the control signal for the control element, the actuator control signal, and/or measurement values corresponding to the measurement variable measured by the sensor; and using an injector model, calculates the amount of liquid fuel discharged via the discharge opening of the at least one injector, compares the amount of liquid fuel calculated via the injector model with a desired target value of the amount of liquid fuel, and causes the control device to adjust the back pressure in accordance with the result of the comparison; and wherein the injector model comprises at least:

pressure progressions in volumes of the at least one injector at least partially filled with the liquid fuel;

mass flow rates between the collection volume and at least one additional volume of the at least one injector at least partially filled with the liquid fuel;

a position of a needle of the at least one injector relative to a needle seat corresponding to the needle; and solenoid valve dynamics of an actuator of the needle.

13. The internal combustion engine of claim 12, wherein the algorithm, using the injector model, causes the control device to adjust the actuator control signal in accordance with the result of the comparison.

14. An internal combustion engine comprising:

a control device; and at least on injector for liquid fuel comprising a discharge opening for the liquid fuel;

wherein the at least one injector is connected to a collection volume via a line for liquid fuel through which the liquid fuel can flow from the at least one injector to the collection volume;

wherein a control element adjustable by the control device via a control signal, adjusts a back pressure in the line for liquid fuel to adjust an amount of liquid fuel discharged via the discharge opening of the at least one injector;

wherein the control device controls or regulates the at least one injector using an actuator control signal, wherein a sensor is operable to measure a measurement variable of the at least one injector, wherein the sensor has a signal connection to the control device, and an algorithm is stored in the control device, which:

receives as input variables at least the control signal for the control element, the actuator control signal, and/or measurement values corresponding to the measurement variable measured by the sensor; and using an injector model, calculates the amount of liquid fuel discharged via the discharge opening of the at least one injector, compares the amount of liquid fuel calculated via the injector model with a desired target value of the amount of liquid fuel, and causes the control device to adjust the back pressure in accordance with the result of the comparison; and wherein the control device is designed to execute the algorithm during each combustion cycle or selected combustion cycles of the internal combustion engine, and in case of deviations, to correct the actuator control signal and/or a pilot control signal during this combustion cycle.

15. The internal combustion engine of claim 14, wherein the algorithm, using the injector model, causes the control device to adjust the actuator control signal in accordance with the result of the comparison.

\* \* \* \* \*